(No Model.) 4 Sheets—Sheet 4.

F. T. NICHOLSON.
MACHINE FOR MAKING ENVELOPES.

No. 448,250. Patented Mar. 17, 1891.

WITNESSES
C. M. Newman,
Arley P. Munson

INVENTOR
Francis T. Nicholson
By A. M. Wooster
Atty.

UNITED STATES PATENT OFFICE.

FRANCIS T. NICHOLSON, OF STAMFORD, CONNECTICUT, ASSIGNOR OF ONE-HALF TO REUBEN MAPELSDEN, OF BROOKLYN, NEW YORK.

MACHINE FOR MAKING ENVELOPES.

SPECIFICATION forming part of Letters Patent No. 448,250, dated March 17, 1891.

Application filed August 9, 1890. Serial No. 361,524. (No model.)

*To all whom it may concern:*

Be it known that I, FRANCIS T. NICHOLSON, a citizen of the United States, residing at Stamford, in the county of Fairfield and State of Connecticut, have invented certain new and useful Improvements in Machines for Making Envelopes; and I do hereby declare the following to be a full, clear, and exact description of the invention, such as will enable others skilled in the art to which it appertains to make and use the same.

My invention has for its object to so improve the construction of machines for making envelopes that the entire envelope shall be formed from the blank and completed by a single machine—that is to say, envelope-blanks being fed to the machine, the end flaps, sealing-flap, and closing-flap shall be folded-the sealing-flap gummed and stuck to the end flaps, the closing-flap gummed ready for use, and the envelopes counted ready for the package-bands in a single continuous series of operations performed by a single machine.

The result of my invention is, briefly, that the method of making envelopes is simplified, the production is increased, and the cost of production greatly reduced.

In order to accomplish the desired result in the simplest manner possible, I have devised the novel mechanism which I will now describe, referring by numerals to the accompanying drawings, forming part of this specification, in which—

Figure 1:
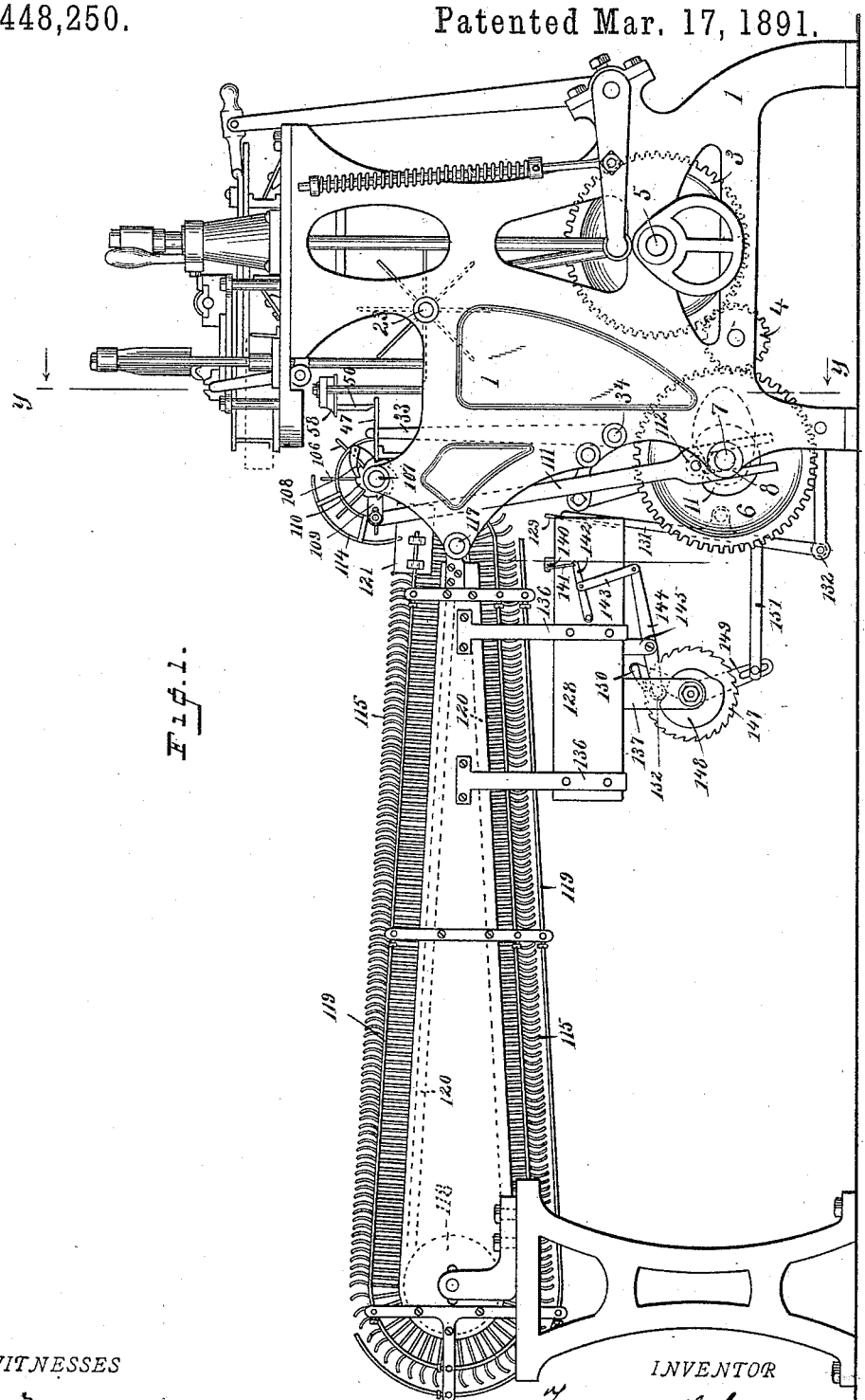
Figure 2:
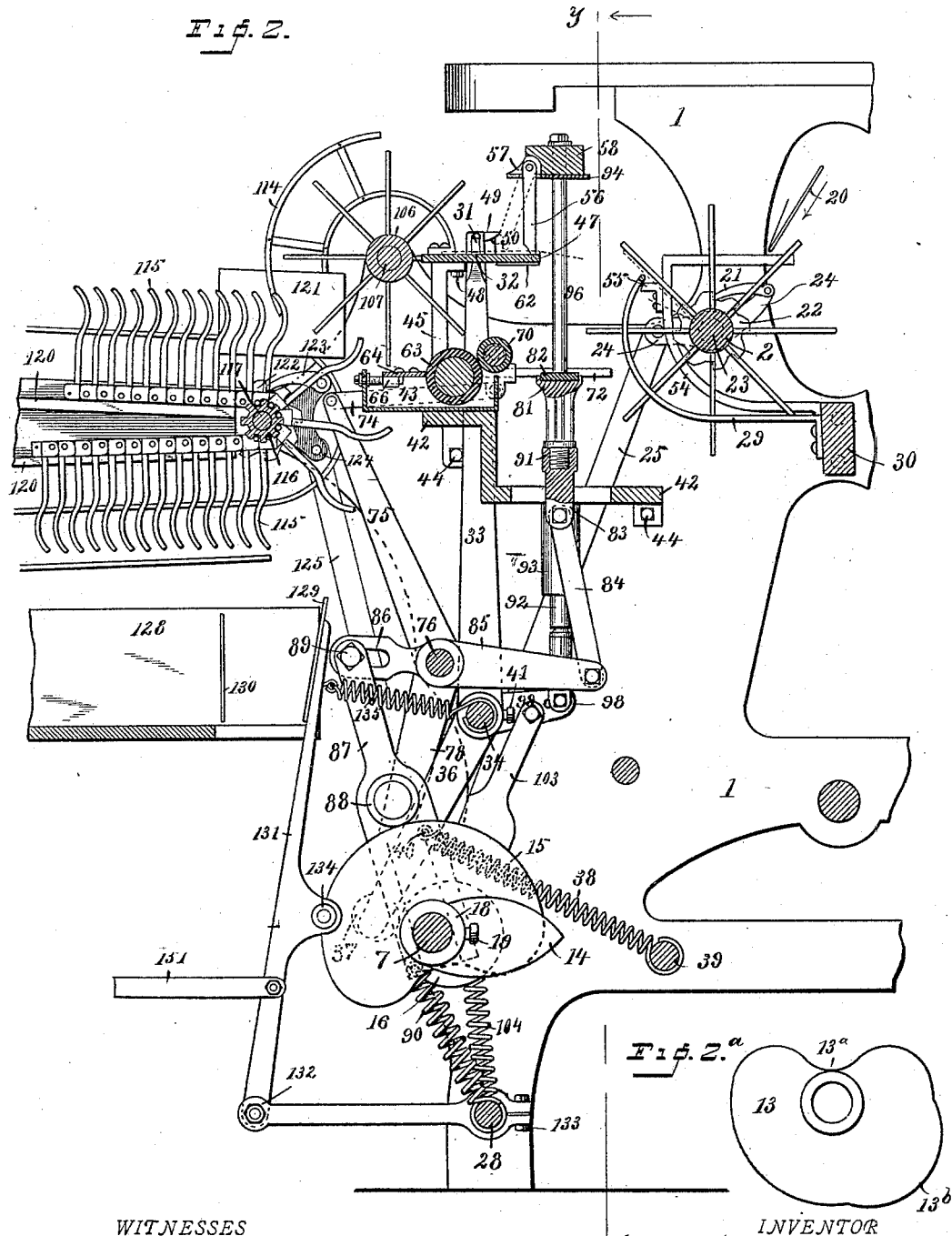
Figure 3:
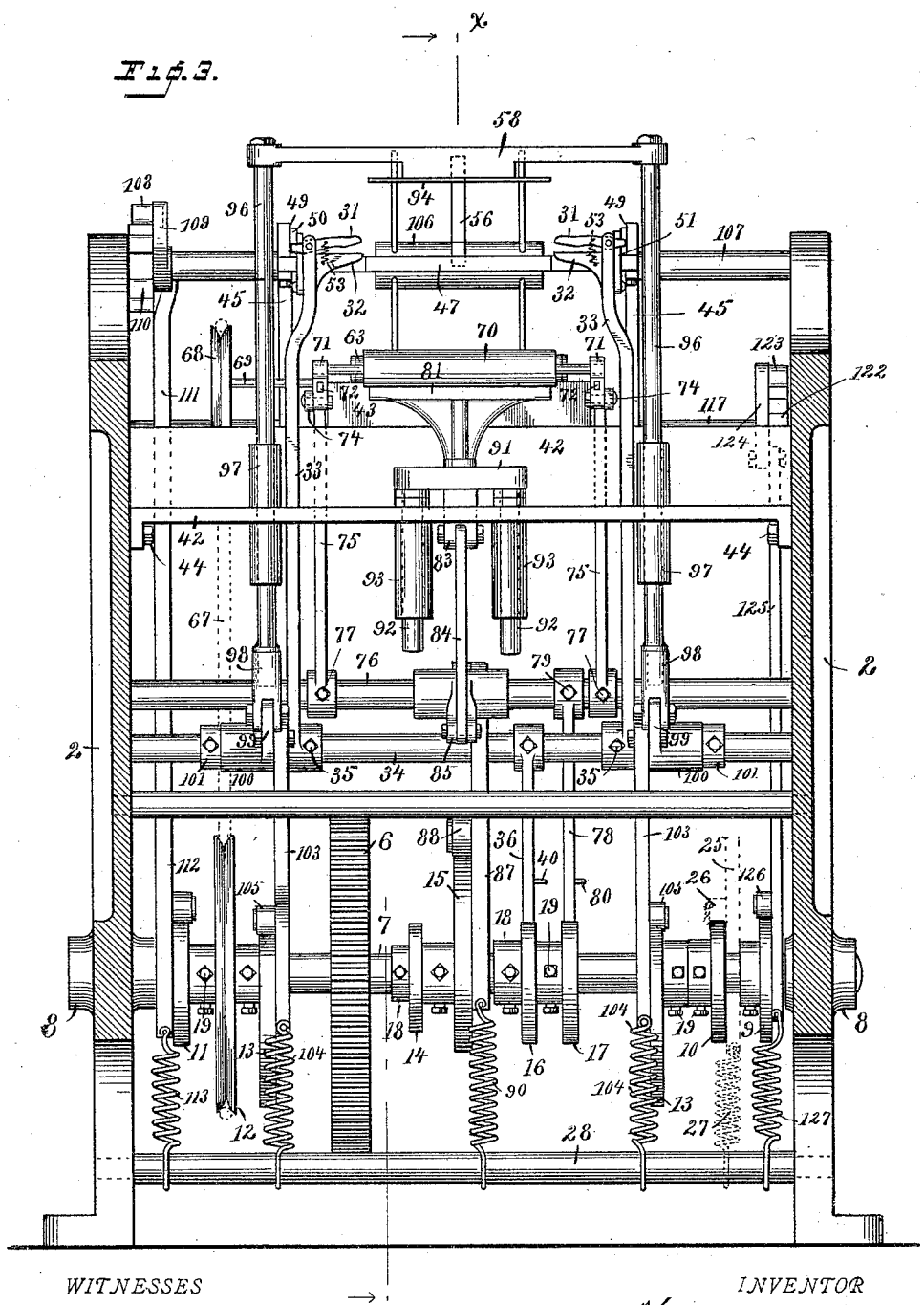
Figure 4:
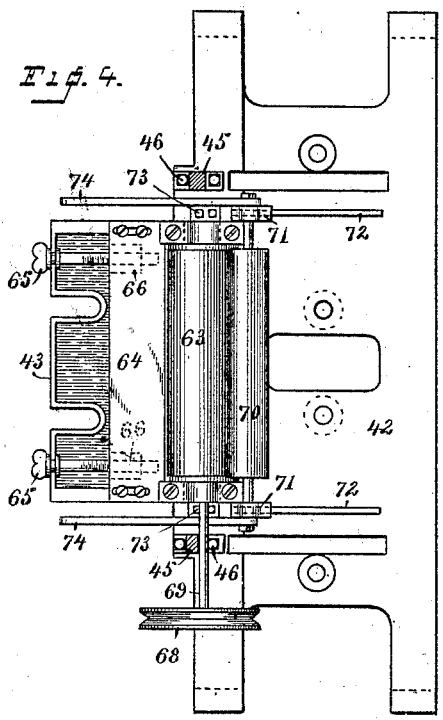
Figure 5:
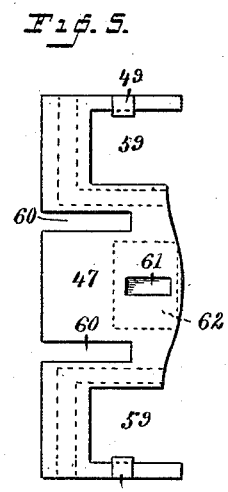
Figure 6:
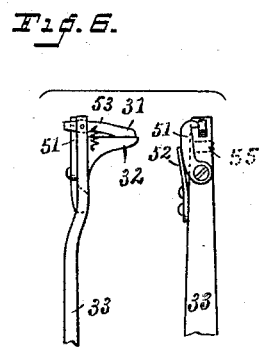
Figure 7:
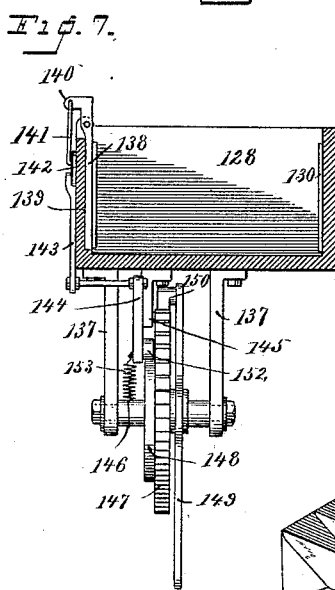
Figure 8:
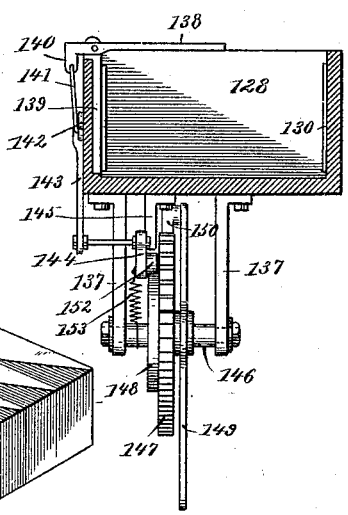
Figure 9:
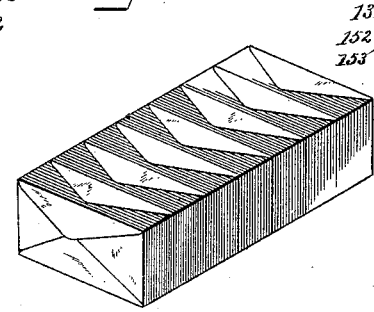

Figure 1 is a side elevation of a machine for making envelopes, showing the application thereto of my novel improvements; Fig. 2, a section of my novel mechanism for gumming the closing-flap, the section-line being indicated by *x x* in Fig. 3; Fig. 2ª, a detail of the cam which operates the reciprocating cross-piece detached; Fig. 3, a transverse section of the frame-work of a machine for making envelopes, showing my improved mechanism for gumming the closing-flaps in elevation, the section-line being indicated by *y y* in Fig. 1; Fig. 4, a detail plan view of the bed, gum-tank, and rollers; Fig. 5, a plan view of the gumming-table detached; Fig. 6, side and rear elevations of the fingers which carry the envelope from the receiving-reel to the gumming-table; Figs. 7 and 8, cross-sections, on an enlarged scale, of the receiving-box, showing the two extremes of movement of the counting-lever and the mechanism by which it is actuated; and Fig. 9 is a perspective of completed envelopes, showing the manner in which the closing-flap of the last envelope in each package is turned up by the counting-lever.

The special manner in which the envelope-blanks are folded and the sealing-flap gummed and pressed down upon the end flaps forms no portion of my present invention, my present mechanism, in fact, being applicable to any ordinary machine for folding and sealing envelopes, it being understood that my present invention is confined to the gumming of the closing-flaps and the counting of the envelopes ready to receive the package-band.

Turning now to Fig. 1, 1 denotes the frame-work of a machine for folding and sealing envelopes, which may be of any ordinary or preferred construction. The mechanism shown in Fig. 1, which lies to the right of section-line *y y*, with the exception of the receiving-reel denoted by 2, gear 3, and pinion 4, is in common use in machines for making envelopes and forms no portion of my present invention. 5 denotes the main driving-shaft of the machine, the various mechanisms for folding, gumming, and sealing the envelopes being driven from this shaft. These mechanisms, however, are not shown in the drawings. Gear 3 upon this shaft drives the whole of my novel mechanism through pinion 4, which engages gear 6 upon shaft 7, this shaft extending across the machine from side to side and being journaled in suitable bearings 8 in the frame-work.

Turning now to Fig. 3, beginning at the right-hand end of shaft 7, as seen in this figure, 9 is a cam rigidly secured thereto, from which the carrying-chain is driven. The next cam toward the left, which I have designated by 10, imparts motion to the receiving-reel. At the opposite end of this shaft is a cam, (denoted by 11,) from which the delivering-reel is driven. Cams 9 and 10 are in face view the same as cam 11, which appears clearly in Fig. 1. At the right of cam 11 is a belt-pulley 12, from which the stationary gum-roller is driven. At the right of pulley 12 and at the left of cam 11, at some distance apart on the shaft, are two cams 13, similar to each other, from which the reciprocating cross-piece is operated. Continuing toward the right from the left cam 13, the next part carried by shaft 7 is gear 6, by which the shaft is driven. Next to the right of gear 6 is a cam 14, from which the counting mechanism is operated. Next to the right of cam 14, and at about the mid-length of shaft 7, is a cam 15, from which the gummer is operated. Next to the right of cam 15 is a cam 16, from which the carrying-fingers are operated, and next to the right of cam 16 and to the left of the right cam 13 is a cam 17, from which the traveling gum-roller is operated. Cam 17 is the same in face view as cam 16, which appears clearly in Fig. 2. These cams are all provided with hubs 18, and each hub is locked to the shaft by two set-screws 19. It will of course be understood that when my improved mechanism is used in connection with the other parts of an envelope-making machine, as indicated in Fig. 1, the shaft 7 thereof must be timed to correspond with the main shaft of that special machine. During each revolution of these two shafts an envelope-blank is folded, the sealing-flap gummed and pressed down upon the end flaps, the closing-flap gummed and dried, and the completed envelope counted, although, as already stated, the special mechanism by which the blank is folded and the sealing-flap secured in place is not of the essence of my present invention.

Turning now to Fig. 2, 20 denotes an envelope at the instant it is dropping from the folding and sealing mechanism into the receiving-reel 2 of my improved mechanism. It will be noticed that as the envelope is dropped the closing-flap is down, this flap being toward the left, as seen in the drawings, the free end extending upward. The reel consists of two independent sets of arms, each arm being firmly secured to the hub, but the arms being wholly independent of each other—that is to say, the arms in the two sets are not connected to each other or to the arms of the opposite set. As soon as the envelope is dropped between two pairs of arms the reel is caused to make a forward movement by means of a pawl 21, which engages a ratchet 22, rigidly secured to a shaft 23, which carries the reel, said shaft being journaled in the frame-work at opposite sides of the machine. This pawl is carried by an arm 24, which turns freely on shaft 23. The opposite end of this arm is pivoted to a connecting-rod 25. The lower end of this rod is bifurcated and straddles shaft 7. Reciprocatory motion is imparted to the rod to oscillate arm 24 by means of a roller 26, which engages the periphery of cam 10, the lower end of the rod and the roller being indicated by dotted lines in Fig. 3.

27 (see dotted lines, Fig. 3) denotes a spring, one end of which is connected to rod 25 and the other to a cross bar or brace 28, which extends across the machine from side to side. It is not deemed necessary to make a special view to show the lower end of rod 25 and the roller and spring in full lines, as the movement is precisely similar to others shown in full lines and which will presently be described. It will of course be understood that the movement of reel 2 just described carries the envelope forward from the position shown, and that at the instant the movement stops another envelope is dropped into the reel and another forward movement takes place. At the second forward movement of the reel the movement of the first envelope is stopped by a curved arm 29, which extends upward from the cross-piece 30, to which the lower end of this arm is rigidly secured. This arm is preferably formed from a single piece of wire bent backward upon itself, the center of the piece of wire forming the upper portion of the arm and being shown in section in Fig. 2, in which one side only of the arm appears, the two parts of arm 29 lying between the two sets of arms of the reel. This arm may of course be made from a piece of sheet metal, if preferred. In order that the operation of the machine may be more clearly understood, I have indicated the position of an envelope at this instant by dotted lines in Fig. 2. While the envelope is in this position its opposite ends are seized by two pairs of carrying-fingers 31 and 32. These fingers are clearly shown in Fig. 3 and in detail in Fig. 6. The lower fingers, which I have denoted specifically by 32, are formed integral with or rigidly secured to arms 33. These arms are provided at their lower ends with hubs which are locked to a rock-shaft 34 by means of set-screws 35 or in any suitable manner. The rock-shaft is oscillated by means of an arm 36, which extends downward, and is provided at its lower end (see dotted lines, Fig. 2) with a roller 37, which bears upon the periphery of cam 16.

38 denotes a spring, one end of which is connected to a cross-piece 39 and the other to a pin 40 (see Figs. 2 and 3) upon arm 36. At the upper end of arm 36 is a hub, through which the rock-shaft passes. The arm is locked in position by a set-screw 41, passing through the hub and engaging the shaft. Before describing the upper fingers in detail, I will refer briefly to other portions of the machine, in order that the operation of these fingers may be clearly understood. 42 denotes a bed by which the gum-tank 43 is supported, and which is itself rigidly secured to the side pieces of the frame-work by bolts 44, which pass through ears upon the under side of the bed.

45 denotes standards rigidly secured to the bed by bolts 46. (See Fig. 4.) These standards support the gumming-table 47, which is rigidly secured thereto by bolts 48, which pass through ears at the upper ends of the standards. Upon the upper side of the gumming-table, at the ends thereof, are projections 49, having inclines 50 on their under sides. The upper fingers 31 are pivoted in slots at the upper ends of arms 33, the rear ends of these fingers passing entirely through the slots and extending backward from the arms sufficient distance to enable them to be grasped by hooks 51 when the fingers are raised and to be held at the raised position by said hooks.

52 denotes springs acting to throw the hooks to the locking position when the fingers are tilted. (See Figs. 2, 3, and 6.) At each rotation of shaft 7 rock-shaft 34 is oscillated in the manner just described, one extreme of the oscillation of arms 33 being shown in Fig. 2. Each time the arms swing backward from their forward position (not shown) toward the retracted position shown in Fig. 2 the rear ends of fingers 31 pass under inclines 50 upon the gumming-table and are tilted—that is to say, the rear ends of the fingers are pressed down, throwing the operative ends upward, as shown in Figs. 2 and 3. As soon as the fingers have reached the raised position, springs 52 will force hooks 51 over the rear ends of the fingers and hold them at the raised position.

53 denotes springs connecting the upper and lower fingers and acting to draw the upper fingers to the closed position, the raising of the upper fingers being against the power of these springs.

54 (see Fig. 2) denotes arms rigidly secured to cross-piece 30. It should be understood that there are two of these arms just alike on opposite sides of the receiving-reel, one only of these arms, however, appearing in the drawings. These arms serve a double purpose, acting as guards to insure that each envelope, as it is dropped from the folding and sealing mechanism, passes between the two pairs of arms of the receiving-reel, and also serving as supports for tripping-lugs 55. At the instant that the fingers are swung forward by oscillation of the rock-shaft 34, the upper finger being raised, as in Fig. 3, the receiving-reel will be stationary, and an envelope (see dotted lines, Fig. 2) will have been stopped by curved arm 29 and will be resting against said arm, the closing-flap being under the arm, the free end thereof extending upward. As arm 33 and the fingers approach their extreme forward position, the opposite ends of the envelope will lie between the two pairs of fingers, the fingers remaining open until hooks 51 engage tripping-lugs 55 and move the hooks backward off the rear ends of the upper fingers, as clearly shown at the right in Fig. 6, the relative position of one tripping-lug at this instant being dotted in Fig. 6. The instant the hooks have been moved off from the rear ends of the upper fingers, springs 53 will act to close said fingers upon the ends of the envelope. As the return movement of arms 33 takes place, the envelope will be carried by the fingers from the receiving-reel to the gumming-table. As the envelope moves forward, the closing-flap is caught by the upper end of arm 29 and opened out, and in this position is carried to the gumming-table, an envelope in this position being indicated by dotted lines in Fig. 2. In order to hold the envelope stationary upon the gumming-table after it is released by the fingers in the manner already described, I provide a swinging holder 56, the upper end of which is loosely pivoted in a socket 57 in a reciprocating cross-piece 58, the operation and function of which I shall presently describe. The shape of the gumming-table is clearly shown in Fig. 5.

59 denotes recesses or cut-away portions for arms 33 to work in.

60 denotes recesses for the arms of the delivering-reel, which I shall presently describe, and 61 denotes a recess to receive the lower end of the swinging holder.

62 denotes a plate secured to the under side of the gumming-table and closing the bottom of the recess, for a purpose presently to be explained. The gumming of the closing-flaps is performed in the manner which I will now describe.

63 denotes a roller journaled at the opposite ends of the gum-tank. This roller I shall refer to as the "stationary" gum-roller.

64 denotes a scraper upon the top of the gum-tank made adjustable by means of set-screws 65, the threaded inner ends of which engage bosses 66 on the under side of the scraper and the outer ends of which are held against endwise movement in the front edge of the tank. The scraper is set sufficiently close to the gum-roller to prevent surplus gum from being carried over by it, the roller rotating from left to right. Rotation is imparted to the roller by a belt 67, which passes over belt-pulley 12 on shaft 7 and a belt-pulley 68 on the shaft 69 of the stationary gum-roller. (See Fig. 3.)

70 denotes a traveling gum-roller journaled in carriers 71, which slide on ways 72. These ways are made sufficiently strong to support the carriers firmly, the inner ends of the ways being secured to the bed by bolts 73. (See Fig. 4.) Reciprocatory motion is imparted to the carriers for the purpose of moving the traveling roller backward and forward between the stationary gum-roller and the gummer, which I shall presently describe, by means of links 74, the respective ends of which are pivoted to the carriers and to arms 75, the lower ends of which are provided with hubs and are locked to a rock-shaft 76 by set-screws 77, (see Fig. 3,) the rock-shaft being journaled in the opposite side pieces of the frame-work. Oscillation is imparted to the rock-shaft through an arm 78, having at its upper end a hub, through which the rock-shaft passes and to which it is secured by a set-screw 79. The lower end of arm 78 engages cam 17 on shaft 7, a spring (not shown and lying directly behind spring 38, as seen in Fig. 2) acting to hold the arm in contact with the cam. One end of this spring is connected to cross-piece 39 in the same manner as spring 38, the other end being connected to a pin 80, extending outward from arm 78. It will thus be seen that at each rotation of shaft 7 through the rock-shaft, arms, and links the carriers and the traveling gum-roller will be caused to move forward and backward on the ways.

81 (see Figs. 2 and 3) denotes the gummer. I have not shown the gummer in plan view, as it is obvious that it must be made the exact shape of the portion of the inner surface of the closing-flap of the envelope to which it is desired to apply the gum. I preferably provide a gumming-surface 82, (see Fig. 2,) made of hard rubber and set into the gummer proper. Vertical reciprocatory movement is imparted to the gummer by the mechanism which I will now describe. Upon the under side of the gummer is a yoke 83, to which is pivoted a link 84, the opposite end of said link being pivoted to one arm of a rock-lever 85, which is adapted to oscillate on rock-shaft 76, said shaft serving as a bearing for the rock-lever. At the opposite end of the rock-lever is a slot 86.

87 is a connecting rod, the lower end of which is bifurcated to straddle shaft 7. This rod is provided with a roller 88, which engages the periphery of cam 15. The upper end of the rod is pivoted to the rock-lever by a bolt 89, passing through slot 86, the slot being made in the rock-lever, so as to provide a convenient adjustment for regulating the upward movement of the gummer at each rotation of shaft 7. A spring 90, one end of which is connected to the connecting-rod and the other to cross-bar 28, acts to retain the roller in engagement with the periphery of the cam. In order to secure perfect steadiness of movement, the gummer is provided with a cross-piece 91, (see Fig. 3,) having depending therefrom rods 92, which pass through the bed and through sleeve 93 on the under side of the bed.

In Fig. 2 the gummer is shown at the lowest point of its movement. While in this position the traveling gum-roller moves over to the gummer and deposits gum thereon, presently to be deposited upon the closing-flap of the envelope on the gumming-table by the gummer itself. It will thus be seen that at each rotation of shaft 7 the traveling gum-roller receives gum from the stationary gum-roller, then moves over and deposits gum upon the gummer, and then moves backward out of the way. At this instant and while the envelope is on the gumming-table in the position indicated by dotted lines in Fig. 2 the upward movement of the gummer commences, the top of the gumming-surface moving up flush with the surface of the gumming-table, at which point the gumming operation takes place. As already stated, after the envelope is released by the fingers it is held in position upon the gumming-table by the swinging holder 56. Just before the gummer reaches its operative position—that is, the position in which it deposits gum upon the closing-flap of an envelope—reciprocating cross-piece 58 moves down from the position shown in Fig. 2 and rests upon the top of the envelope during the gumming operation, thus holding it firmly in position.

In Fig. 2 I have shown in full lines the position of the swinging holder just before an envelope has been passed to the gumming-table or just after its removal therefrom, and have indicated by dotted lines its position after the envelope has stopped moving forward, the envelope having swung the holder outward toward the left. When the downward movement of the reciprocating cross-piece takes place, the swinging holder slides over the top of the envelope toward the left into a horizontal position, (not shown,) so as not to interfere with the downward movement of the cross-piece, the swinging holder serving to hold the envelope lightly during the instant of time that elapses after it is released by the fingers and before it is engaged by the reciprocating cross-piece at its lowered position. In practice the lower end of the swinging holder hangs loosely in recess 61, so that when an envelope is carried to the gumming-table by the fingers the envelope will swing the holder forward out of the recess, the holder resting upon the envelope and sliding forward out of the way when the reciprocating cross-piece descends. Should it happen from any cause, however, that no envelope is carried to the gumming-table, the holder will not be swung forward, but will remain in a vertical position, and when the downward movement of the cross-piece commences the lower end of the holder will strike the bottom of the recess in the gumming-table and arrest the downward movement of the cross-piece. I thus avoid the possibility of any gum getting upon the cross-piece and gumming the outer sides of the closing-flaps, as it is made impossible for the cross-piece to descend unless there is an envelope between it and the gummer. The cross-piece is thus kept constantly clean and the danger of gumming any portion of the envelope, except the inner side of the closing-flap, avoided. Instead of attaching a plate to the under side of the gumming-table, the table itself may be thickened under the recess, if preferred, it being simply necessary to provide sufficient strength to stand the thrust of the swinging holder when the downward movement takes place and there is no envelope on the gumming-table. The contact portion of the reciprocating cross-piece is a plate 94, which is secured to the under side of the cross-piece proper. (See Fig. 3.) Vertical reciprocating motion is imparted to this cross-piece in the manner which I will now describe. The cross-piece is carried by rods 96, which pass through sleeves 97, extending on opposite sides of the bed. At the lower ends of rods 96 are yokes 98, pivoted to rock-levers 99, which are mounted on rock-shaft 34 and oscillate thereon, the shaft serving as a bearing for the hubs 100 of the rock-levers, these hubs being held against endwise movement on the rock-shaft by the hubs of arms 33 on the inner sides and collars 101 on the outer sides thereof.

103 denotes connecting-rods, the upper ends of which are pivoted to rock-levers 99, the lower ends being bifurcated in the same manner as connecting-rod 87, so as to straddle shaft 7.

105 denotes rollers upon the connecting-rods, which engage the peripheries of cams 13 on shaft 7. The shape of these cams is clearly shown in Fig. 2$^a$. Approximately one-half of the periphery of each cam is an arc of a circle, of which shaft 7 is the center.

13$^a$ indicates depressions in the peripheries of these cams, which are engaged by rollers 105 at the instant that the reciprocating cross-piece is lowered to hold the envelope during the gumming operation. While rollers 105 are in engagement with the circular portion of the peripheries of these cams the cross-piece will be held at its normal raised position—that is, as shown in Figs. 2 and 3.

13$^b$ denotes rounded projections on the peripheries of cams 13, the function of which is to raise the reciprocating cross-piece, and with it the swinging holder, still higher than the position shown in Figs. 2 and 3, so as to insure that the swinging holder will be entirely out of the way at the instant the envelope is picked up by the arms of the delivering-reel. Rollers 105 are retained in contact with the peripheries of cams 13 by means of springs 104, the upper ends of which are connected to the connecting-rod, (see Fig. 3,) the lower ends being connected to cross-bar 28. It will be seen, therefore, that at each rotation of shaft 7 the reciprocating cross-piece will be moved downward from the position shown in Fig. 2 to hold an envelope during the gumming operation, then raised again to the position shown in Fig. 2, then raised above that position during the instant that the gummed envelope is being picked up by the delivering-reel, and then returned again to its first position.

106 denotes the delivering-reel, which consists of a hub mounted on a shaft 107, which is journaled in the side pieces. The reel proper is preferably made in the same manner as reel 2—that is, consisting of two independent sets of arms, each arm being firmly secured in the hub but independent of the other arms. Intermittent rotary motion is imparted to the delivering-reel by means of a pawl 108, (see Fig. 1,) which is carried by an arm 109, mounted on shaft 107 and adapted to oscillate thereon. This pawl engages a ratchet 110, rigidly secured to the shaft. (See Figs. 1 and 3.) At the forward end of arm 109 (see Fig. 1) is pivoted a connecting-rod 111, which is bifurcated at its lower end and straddles shaft 7 in the same manner as other connecting-rods already described. This rod is provided with a roller 112, which engages the periphery of cam 11, a spring 113, one end of which is secured to the connecting-rod, the other to cross-bar 28, acting to hold the roller continuously in engagement with the periphery of the cam. It will be seen that each rotation of shaft 7 will cause cam 11 to lift the connecting-rod, which will swing arm 109 and cause the pawl to carry the ratchet forward one tooth.

It will be apparent from Fig. 2 that when the machine is in use the delivering-reel will be carrying three envelopes at all times, a fifth envelope being picked up from the gumming-table an instant previous to the first being dropped into the drying-chain, which will presently be described.

It will of course be apparent that the several parts of the machine require to be accurately timed, so that at each revolution of shaft 7 an envelope will be received from reel 2 and a gummed envelope will be dropped by the delivering-reel into the drying-chain. In order to prevent the possibility of envelopes dropping out from the reel and to hold them in proper position until the instant they are dropped into the chain, I provide a suitable guard 114, which incloses the reel in such manner as to prevent the envelopes from slipping out at either end or in front.

115 denotes the drying-chain, which does not differ essentially from those in use in this class of machines, and therefore is not thought to require detailed description. The chain consists, in brief, of a series of links loosely riveted together, each of which is provided with an outwardly-extending arm or pair of arms. The inner end of the chain passes around a sprocket 116, the shaft 117 of which is journaled in the frame-work, the outer end of the chain passing around a drum 118. (See dotted lines, Fig. 1.) Guards 119 are provided, which prevent the envelopes from slipping out of the chain under any circumstances, and also cleats 120, which are engaged by the links and prevent the chain from sagging, it being understood, of course, that the chain may be made as long as may be required to dry the gum upon the envelopes thoroughly before they are counted and bunched. At the instant the envelope passes from the delivering-reel to the chain it is prevented from escaping or being blown out by guard-plates 121 on opposite sides of the reel. Motion is imparted to the chain in the manner which I will now describe.

122 denotes a ratchet at one end of shaft 117, which is engaged by a pawl 123, carried by an arm 124, which oscillates on the shaft. 125 denotes a connecting-rod pivoted to the other branch of arm 124, this arm being made approximately the shape of a bell-crank lever. (See Fig. 2.) This connecting-rod is bifurcated at its lower end and straddles shaft 7 in the same manner as the other connecting-rods previously described.

126 is a roller carried by rod 125, which engages the periphery of cam 9. A spring 127, one end of which is connected to cross-bar 28, the other to the connecting-rod, acts to hold the roller in contact with the periphery of the cam at all times. It will be seen that each revolution of shaft 7 will oscillate arm 124 and cause the pawl to carry the ratchet forward one tooth, imparting of course a corresponding movement to the chain.

It will be readily understood from what has already been said that at each actuation of the machine—that is, at each rotation of shaft 7—an envelope will be dropped by the delivering-reel between two of the arms of the chain, each envelope as it is carried around by the chain being held in position by guards 119 until it is brought nearly to the starting-place on the under side of the reel. When each envelope has been carried to the inner end of the guard, (see Fig. 2,) the forward arm of the pair between which it is held will swing outward, as clearly shown in Figs. 1 and 2, as it begins to pass upward around the sprocket. This permits the envelope to drop out of the chain and down into the receiving-box 128. Just after the envelope drops into the receiving-box it is moved forward by a pusher 129 past cleats 130, which are just high enough to engage the opposite ends of the envelope and prevent it from moving backward again. The pusher consists of a plate carried by a lever 131, the lower end of which is pivoted to a bracket 132. This bracket may be connected to any suitable portion of the machine. I have shown it as extending outward from cross-bar 28, the inner end of the bracket being provided with arms which clamp the cross-bar and are locked in position by a bolt 133. This bracket is clearly shown in Fig. 2, but is omitted from Fig. 3 for the sake of clearness.

134 denotes a roller carried by lever 131, which is adapted to be engaged by cam 14 on shaft 7. The shape of this cam is clearly shown in Fig. 2. Its action is to move the pusher forward quickly to carry the envelope past cleats 130 and then leave the pusher free to be retracted by a spring 135, one end of which is connected to lever 131, the other to rock-shaft 34. The receiving-box is supported in any suitable manner. I have shown it as held in position by brackets 136, which are themselves secured to the portion of the framework which carries the chain.

The counting mechanism, which I will now describe, is carried by brackets 137, themselves attached to the receiving-box or to any suitable portion of the frame-work.

138 denotes the counting-lever, which is pivoted at the top of the receiving-box and is adapted to swing downward into a recess 139 in the inner side of said box, so as to be entirely out of the way. (See Figs. 7 and 8.) At the outer end of this lever is an arm 140.

141 denotes a link, one end of which is connected to arm 140, the other to a lever 142, pivoted to the side of the counting-box. 143 is another link, one end of which is pivoted to lever 142 and the other to one end of a lever 144, which is itself pivoted to a bracket 145 on the under side of the receiving-box.

146 denotes a shaft journaled in brackets 137. This shaft carries a ratchet 147 and a cam 148, having a raised portion and a depressed portion in its periphery.

149 is an arm, which oscillates freely on shaft 146 and carries pawl 150, which engages the ratchet.

151 denotes a link, one end of which is pivoted to lever 131, the other being pivoted in a slot at the lower end of arm 149, the slot being provided so as to give a convenient means of adjusting the throw of the arm and consequently the movement of the pawl. At the end of lever 144, opposite to the pivotal point of link 143, is a roller 152, which engages the periphery of cam 148. The teeth of ratchet 147 correspond in number with the number of envelopes that it is desired to have in a bunch or package—for example, twenty or twenty-five. When it is desired to change the count, a new ratchet is substituted. Each actuation of the machine—that is, each rotation of shaft 7 through the mechanism just described—will cause pawl 150 to move this ratchet forward one tooth.

Suppose the number of envelopes required for each package to be twenty-five. Just after the pusher has forced the twenty-fifth envelope past the cleats roller 152 will ride up one of the inclines of cam 148 (see Fig. 1) and will rest upon the raised portion of the surface of said cam. This will swing the counting-lever from the position shown in Fig. 7 to the position shown in Fig. 8. As the lever moves upward, it passes under the flap of the twenty-fifth envelope and raises it slightly above the horizontal position. The counting-lever remains in this position, while roller 152 is in engagement with the raised portion of the periphery of the cam. The exact length of time that the counting-lever is held raised is immaterial, it being of course necessary that it be held in that position until quite a number of envelopes have been pushed into the counting-box, preferably about half a package, so as to prevent the possibility of the sealing-flap getting bent down and caught between the envelopes. When the predetermined number of envelopes shall have been placed in the receiving-box by the pusher, roller 52 will ride down the other incline of cam 148, which will throw the counting-lever from the position shown in Fig. 8 to that shown in Fig. 7. This movement of course takes place just after the return movement of the pusher, so as to avoid danger of an envelope being caught by the lever. A spring 153, one end of which is connected to arm 144 and the other to shaft 146, acts to hold the roller continuously in engagement with the periphery of the cam.

The operation of each portion of the machine has been so fully described in describing the construction and arrangement of the parts that a description of the general operation is not thought to be required.

It will of course be understood that the various details of construction may be varied greatly without departing from the principle of my invention. I have illustrated and described special forms of mechanism which I have tested in use and have found to be thoroughly practical.

Having thus described my invention, I claim—

1. In a machine of the class described, the combination, with the receiving-reel and the gumming-table, of the fingers whereby envelopes are carried from the reel to the table, the reciprocating cross-piece whereby the envelope is held on the table, and the gummer.

2. In a machine of the class described, the combination, with receiving-reel and the gumming-table, of the fingers whereby envelopes are carried from the reel to the table, the reciprocating cross-piece whereby the envelope is held on the table, the gummer, and curved arm 29, whereby the envelope is stopped and the closing-flap is opened out as it is removed from the reel by the fingers.

3. In a machine of the class described, the combination, with the receiving-reel and the gumming-table, of the fingers whereby each envelope is carried from the reel to the table, the reciprocating cross-piece whereby the envelope is held on the table, the gummer, and swinging holder 56, acting, substantially as described, to hold the envelope on the gumming-table before it is engaged by the reciprocating cross-piece.

4. The combination, with the receiving-reel, the ratchet, arm 24, and the pawl, of the fingers, and curved arm 29, by which each envelope is stopped and the closing-flap opened out as it is removed by the fingers.

5. In a machine of the class described, the combination, with the receiving-reel and curved arm 29, of the fingers acting as described, and for the purpose set forth.

6. The combination, with the receiving-reel, the curved arm and the gumming-table, of the fingers whereby each envelope is carried from the reel to the table and the closing-flap opened out, the reciprocating cross-piece, and the gummer.

7. The combination, with the receiving-reel, curved arm 29, and the gumming-table, of the fingers whereby each envelope is carried from the reel to the table and the closing-flap opened out, the reciprocating cross-piece, and the swinging holder pivoted thereon, whereby the envelope is held on the table until the cross-piece descends, and the gummer whereby the closing-flap is gummed after the descent of the cross-piece, substantially as described.

8. The combination, with projections 49, having inclines 50, and arms 54, having tripping-lugs 55, of swinging arms 33, carrying-fingers 31 and 32, one finger in each pair being pivoted, spring-actuated hooks 51, acting to hold the pivoted fingers in the open position after they are opened by the inclines, and springs 53, acting to close the fingers when the hooks are disengaged by the tripping-lugs.

9. The gumming-table, projections 49, having inclines 50, and arms 54, having tripping-lugs 55, in combination with the receiving-reel, swinging arms 33, fingers 31 and 32, hooks 51, and springs 52 and 53, all acting as described, whereby each envelope is carried from the receiving-reel to the gumming-table.

10. The combination, with the receiving-reel, the fingers, and the gumming-table, of the gummer and the delivering-reel which takes the gummed envelope from the gumming-table.

11. The combination, with the receiving-reel, curved arm 29, the fingers, and the gumming-table, of the gummer and the delivering-reel.

12. The combination, with the gumming-table and the fingers, of the reciprocating cross-piece, the swinging holder pivoted thereto, and the gummer.

13. The gumming-table having recess 61 and the fingers, substantially as described and shown, in combination with the reciprocating cross-piece and the swinging holder, said holder swinging forward out of the way when an envelope is carried to the gumming-table by the fingers and acting to hold the envelope after it is released by the fingers, and in the absence of an envelope engaging said recess and acting to prevent the downward movement of the cross-piece, as and for the purpose set forth.

14. The gumming-table having recess 61, the reciprocating cross-piece, the swinging holder carried thereby, and the delivering-reel, in combination with cams 13, having depressions 13ª and rounded projections 13ᵇ, rods by which the cross-piece is carried, rock-levers 99, connecting-rods 103, pivoted to the rock-levers and carrying-rollers engaging the cams, and springs 104, acting to hold the rollers in contact with the cams, so that each rotation of the cams acts to move the cross-piece downward to hold an envelope during the gumming operation, then raise it again to its normal position, then raise it above that position while the gummed envelope is being picked up by the delivering-reel, and then return it to its normal position again, substantially as described.

15. The combination, with the gumming-table, the fingers, substantially as described and shown, and the reciprocating cross-piece, of the gummer, which moves upward and gums the closing-flap at the instant an envelope is held upon the gumming-table by the cross-piece.

16. The gumming-table, the reciprocating cross-piece, and the gummer, substantially as described and shown, in combination with the fingers and arm 29.

17. The gumming-table, the reciprocating cross-piece having swinging arm 56, and the gummer, acting as described, in combination with the fingers and arm 29, whereby as each envelope is carried to the gumming-table the closing-flap is opened out into position to be gummed while the envelope is held by the cross-piece.

18. The combination, with the gumming-table, the gummer, the reciprocating cross-piece, and the fingers, substantially as described and shown, of the delivering-reel and the drying-chain.

19. The gumming-table having recesses 60, the delivering-reel operating in said recesses, and the drying-chain, in combination with the gummer and the reciprocating cross-piece.

20. The receiving-box and the pusher, in combination with the counting-lever and mechanism, substantially as described and shown, which acts to swing the counting-lever and raise the closing-flap of the last envelope of a predetermined number.

21. The receiving-box, the pusher, lever 131, and the cam and spring, in combination with link 151, the counting-lever, and intermediate mechanism, substantially as described and shown, whereby the counting-lever is swung outward to raise the flap of the last envelope of a predetermined number.

22. The combination, with the counting-lever, the pusher, lever 131, and cam 14, of ratchet 147, having teeth corresponding in number with the envelopes required in each package, cam 148, rotating with the ratchet, lever 144, engaging the cam, and intermediate mechanism, substantially as described and shown, between lever 144 and the counting-lever and between the ratchet and lever 131, whereby each time an envelope is moved forward by the pusher the ratchet is actuated one tooth, and at the completion of the revolution the counting-lever is raised to lift the flap of the last envelope.

23. The receiving-box having cleats 130 and the pusher, whereby each envelope is carried past the cleats, in combination with the counting-lever, the ratchet, cam 148, moving therewith, and intermediate mechanism, substantially as described and shown, whereby each movement of the pusher carries the ratchet forward one tooth, and at the completion of the rotation of the ratchet and cam the counting-lever is raised and raises the flap of the last envelope, substantially as described.

24. The receiving-box, the pusher, and the counting-lever, in combination with the ratchet having teeth corresponding in number with the envelopes required in each package, a cam moving therewith and having raised and depressed portions in its periphery, a lever 144, engaging the cam, and intermediate mechanism, substantially as described and shown, whereby each movement of the pusher imparts a forward movement to the ratchet, and at the completion of the rotation of the cam lever 144 rides up on the raised portion of the periphery of the cam, which raises the counting-lever, carrying the closing-flap of the last envelope and holds the lever in the raised position until lever 144 rides down on the depressed portion of the periphery of the cam.

25. The receiving-box having recess 139 and the counting-lever pivoted at the top of the box and having an arm 140, in combination with the pusher, ratchet 147, cam 148, lever 144, engaging said cam, and intermediate mechanism, substantially as described and shown, whereby at each movement of the pusher the ratchet is moved forward and at the completion of the rotation the counting-lever is swung out of the recess and into a horizontal position above the receiving-box, as and for the purpose set forth.

26. The receiving-box, the counting-lever, the pusher, lever 131, and link 151, in combination with the ratchet and cam 148 moving therewith, swinging arm 149, pivoted to link 151 and carrying a pawl engaging the ratchet, lever 144, engaging the cam, lever 142, and links 141 and 143, whereby the counting-lever is actuated.

In testimony whereof I affix my signature in presence of two witnesses.

FRANCIS T. NICHOLSON.

Witnesses:
A. M. WOOSTER,
C. M. NEWMAN.